Jan. 11, 1927.  1,613,658
O. HENKER
APPARATUS FOR THE OBJECTIVE MEASUREMENT OF THE REFRACTIVE
VALUE OF THE PRINCIPAL POINT OF THE EYE
Filed Nov. 13, 1925
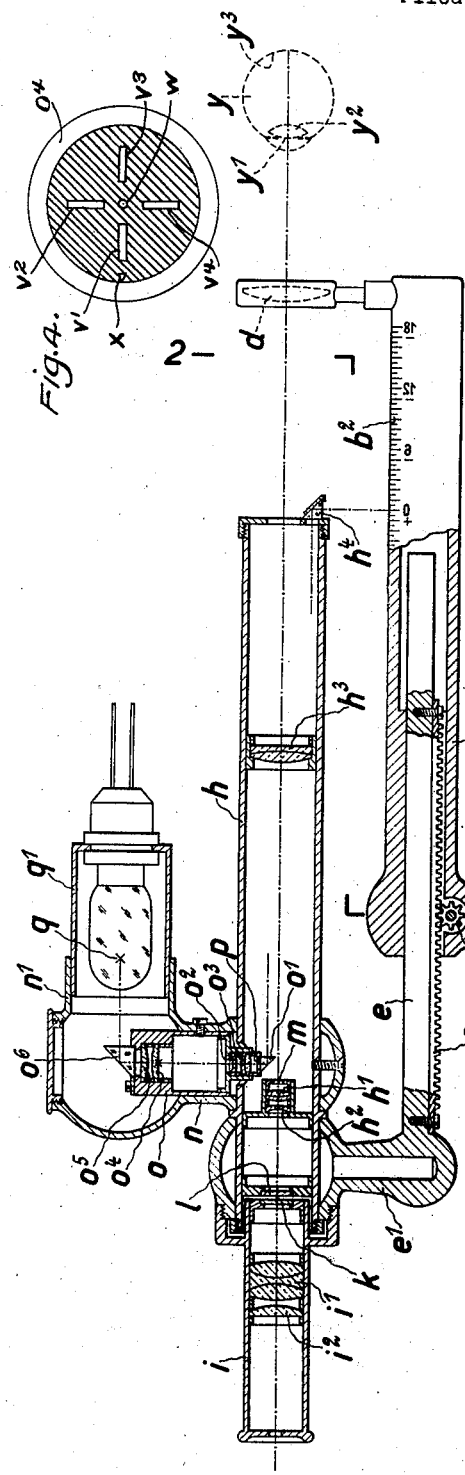
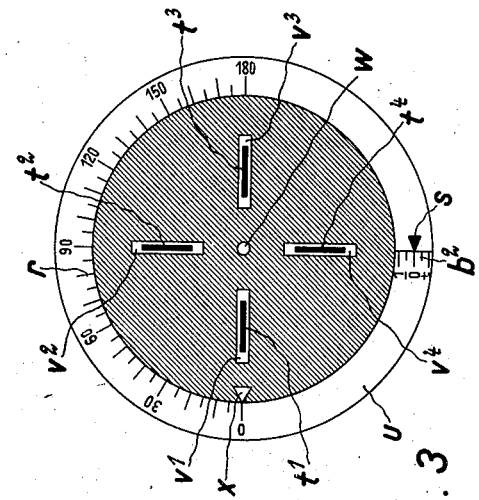
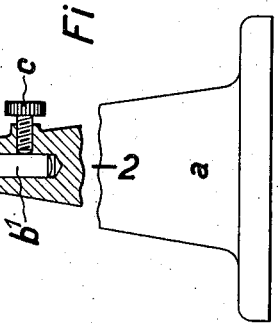
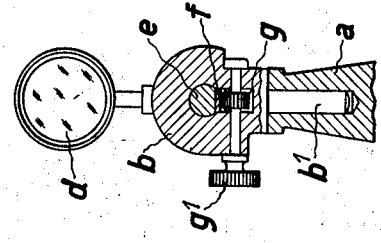
Inventor:
Otto Henker Patented Jan. 11, 1927.

1,613,658

UNITED STATES PATENT OFFICE.

OTTO HENKER, OF JENA, GERMANY, ASSIGNOR TO THE FIRM CARL ZEISS, OF JENA, GERMANY.

APPARATUS FOR THE OBJECTIVE MEASUREMENT OF THE REFRACTIVE VALUE OF THE PRINCIPAL POINT OF THE EYE.

Application filed November 13, 1925, Serial No. 68,896, and in Germany November 5, 1924.

The present invention relates to an apparatus for the objective measurement of the refractive value of the principal point of the eye, by the determination of the locus of an image of the illuminated background of the eye.

The accompanying drawing shows an example of the invention, viz, Fig. 1 a cross section of the device in an elevation, Fig. 2 a section on the line 2—2 of Fig. 1. Fig. 3 illustrates the image which is represented to the observer when looking into the ocular, the device being adjusted to an emmetropic eye. Fig. 4 shows a detail on a larger scale.

The new apparatus contains an illuminating device for illuminating the background of the eye. An observation device contains a diaphragm, and this diaphragm has such a position relatively to a light-aperture of the illuminating device that the diaphragm and the light-aperture are really imaged side by side in the pupil of the eye to be examined. A lens system serves for producing an image of the illuminated background of the eye. The said light-aperture and a material mark are simultaneously rotatable about the optical axis of this lens system. A real image of the said material mark serves as a test mark for determining the locus of the said image of the background of the eye. The test mark and a comparison mark are displaceable in the observation path of rays along the optical axis. The comparison mark may consist of a material mark or of an image of a material mark. When using such a device it is not difficult to even bring the test mark into the locus of the image if owing to particularly great myopia of the eye the image of the background of the eye, produced by the imaging system, be virtual by bringing the test mark through the imaging system near the eye.

When selecting the shape of the test mark it should be taken into consideration that any objectionable dazzling, especially for patients who are very sensitive to light, must be dispensed with. Hence, a test mark which, with the exception of four, e. g. rectangular fields arranged in the shape of a cross and a small circle, denoting the axial point and simultaneously serving as a fixation point for the eye to be tested, consists of an opaque diaphragm, has proved to be particularly suitable. In order to be able to carry out measurements it is advisable to use as a comparison mark a mark lying in the ocular-image plane or in a plane equivalent to the same of the observation path of rays which mark denotes the optical axis. This mark which will show on the background of the eye even very slight eccentric aberrations of the image of the test mark, is suitably constructed in such a way as to consist of radial lines, which are disposed at right angles relatively to each other and which do not intersect the optical axis, and as to be rotatable with the test mark about the optical axis. This form is particularly also suited for testing eyes afflicted with astigmatism.

On a standard $a$ there is rotatable a hollow arm $b$ by means of a pivot $b^1$ and fixable by a screw $c$. It carries at its free end as an imaging system an ophthalmoscopic lens $d$. Within the arm $b$ a second arm $e$ whose free end $e^1$ is constructed as a telescope carrier, is displaceable by means of a rack $f$ and a gear $g$ provided with a milled head $g^1$. A cylindrical telescope casing $h$, rotatable about its longitudinal axis, rests in the telescope carrier $e^1$, whilst an ocular casing $i$, containing an ocular $i^1$, $i^2$, is screwed to the telescope carrier $e^1$ in such a way that its optical axis coincides with the axis of rotation of the casing $h$. This ocular casing $i$ carries at its end a fixed plate $k$. A second plate $l$ is rotatable in the telescope casing $h$. In the plane of the entrance pupil of the telescope formed by an objective $h^1$, $h^2$ and the ocular $i^1$, $i^2$ and adjusted to a large distance, lies a diaphragm $m$. An additional lens $h^3$ supplements the observation instrument to a telescopic magnifier. The free end of the telescope casing $h$ is provided with a reading prism $h^4$ whose ray-entrance surface faces a diopter scale $b^2$, fixed on the arm $b$ and lying in the front focal plane of the additional lens $h^3$.

The telescope casing $h$ is pierced near the diaphragm $m$ and carries an illuminating tube $n$, having a cylindrical insertion-piece $o$ whose end, provided with a light-aperture $p$ and an isosceles, rectangular reflecting prism $o^1$, projects into the casing $h$. Above the light-aperture $p$ is inserted a collimator objective $o^2$, $o^3$, which is similar to the telescope objective $h^1$, $h^2$ and in the focal plane of which lies the front surface of a condenser consisting of two plane-convex lenses $o^4$, $o^5$. This front surface (Fig. 4, representing a front view of the condenser lens $o^4$) is rendered opaque with the exception of a circular ring $u$, four rectangular recesses $v^1$, $v^2$, $v^3$, and $v^4$ disposed crosswise, a small circle $w$ denoting the optical axis and an index $x$. This opaque surface of the lens $o^4$ is a material mark whose image serves as a test mark. The insertion-piece $o$ is upwardly closed by an isosceles, rectangular reflecting prism $o^6$ whose light-entrance surface faces a source of light $q$ fixed in a lateral tube $n^1$ of the illuminating tube $n$ by means of a tube $q^1$. On the plate $k$ there is provided an angular graduation $r$ (Fig. 3), extending up to an angle of 180°, and an index $s$. The zero point of the scale $b^2$ is so chosen that the index $s$ indicates on the scale $b^2$, imaged in the field of view, the zero point of the image of the mark disposed on the lens $o^4$, if this image lies in the focal plane, which is between the additional lens $h^3$ and the ophthalmoscopic lens $d$, of this lens $d$. The plate $l$ carries four lines, disposed crosswise and denoted by $t^1$, $t^2$, $t^3$ and $t^4$, serving as a comparison mark.

The position of a non-accommodated eye $y$ to be tested with its pupil $y^1$ formed by the iris, its lens $y^2$ and its background $y^3$ is shown by dotted lines.

With a view to imaging in an unchanged state the diaphragm $m$ and the light-aperture $p$ into the pupil $y^1$ of the eye $y$ to be tested, whilst the image serving as a test mark and the whole optical outfit of the device save the ophthalmoscopic lens $d$, may be displaced in an axial direction, it is necessary that the pencils by which the diaphragm $m$ and the light-aperture $p$ are imaged, consist each of rays which between the additional lens $h^3$ and the ophthalmoscopic lens $d$ are parallel to each other. However, it follows therefrom that both the diaphragm $m$ and the light-aperture $p$ must lie in the focal plane of the additional lens $h^3$, turned away from the eye $y$. Thereby the diaphragm $m$ is disposed concentrically with the optical axis of the additional lens $h^3$, the light-aperture $p$ eccentrically thereto. Hence, the image of the light-aperture $p$ lies in the eye-pupil $y^1$ by the eccentricity, reduced on the imaging scale, laterally of the optical axis, viz, also laterally of the image of the diaphragm $m$. If the image of the material mark be in the focal plane of the ophthalmoscopic lens $d$ turned away from the eye $y$, this lens $d$ in conjunction with the optical system of the eye $y$ sharply images this image on the background of the eye $y^3$ if the eye $y$ be emmetropic, i. e. if its far point lies at infinity. With this image the axial point of the image again falls upon the optical axis. As, however, the effective aperture for the light entrance into the eye $y$, the image of the light opening $p$ lying upon the eye-pupil, is eccentrically located, the axial ray of the imaging ray pencil intersects the background of the eye $y^3$ of an ametropic eye $y$ laterally of the optical axis, and the indistinct image of the test mark is therefore eccentrically located. The background of the eye $y^3$ is imaged, if the eye $y$ be emmetropic together with the image of the test mark produced on it in the focal plane, turned away from the eye $y$, of the ophthalmoscopic lens $d$. Thereby the image of the observation diaphragm $m$, produced on the eye-pupil $y^1$, acts as a ray-exit aperture. After having been repeatedly imaged, the background of the eye is perceived by the observer in the ocular-image plane of the telescopic magnifier in that position in which the axial point of the test mark again falls upon the optical axis. With an ametropic eye $y$, however, the observer recognizes an indistinct image of the background of the eye $y^3$ with the image of the test mark lying eccentrically to the optical axis.

When using the apparatus the observer works with his left hand the milled head $g^1$, whilst his right hand is free for putting down notes or for rotating the illuminating device with the telescope about its optical axis. The patient's eye $y$ should be so disposed in front of the ophthalmoscopic lens $d$ that the eye-pupil $y^1$ lies in the focal plane of the lens $d$ and consequently the luminous circle $w$ may serve as a fixation point. Thereby the diaphragm $m$ and the light-aperture $p$ are sharply imaged side by side on the eye-pupil $y^1$; their relative position determines the measuring meridian. On looking into the observation device the observer sees the two plates $l$ and $k$ as well as the image of the test mark, lying upon the background of the eye and corresponding to the material mark. Hence, in the observer's eye are united three surfaces provided with marks, viz, the surfaces of the lens $o^4$, of the plate $l$ and of the plate $k$. Fig. 3 shows what is seen by the observer. As a starting position for the illuminating device one suitably uses a position in which the measuring meridian is horizontal. The index $x$ is to be disposed in such a way as to indicate in its starting position on the scale $r$ the angular value zero. With the arrangement selected in the example illustrated the lines $t^1$ and $t^3$ of the plate $l$ simultaneously lie in the horizontal line, i. e. in the measuring meridian. By rotating the milled head $g^1$ one now displaces the arm $e$ with the parts connected thereto until the image of the four luminous rectangles $v^1$, $v^2$, $v^3$ and $v^4$, (Fig. 4) arising on the background of the eye $y^3$ and serving as the aforesaid test mark, appears sharply to the observer. Such is the case in an emmetropic eye $y$ if the index $s$ points to the zero point of the scale $b^2$ and the lines $t^1$, $t^2$, $t^3$ and $t^4$ exactly lie in the centre of the rectangles. In an ametropic, axially symmetrical eye the index $s$ shows the (positive or negative) refractive value of the principal point in diopters if the lines $t^1$, $t^2$, $t^3$ and $t^4$ lie in the centre of the rectangles $v^1$ $v^2$, $v^3$ and $v^4$. However, with an indistinct focusing of the image of the test mark, which appears laterally displaced in the direction of the measuring meridian, i. e. corresponding to the position of the image of the light-aperture $p$ relatively to the image of the diaphragm $m$ on the eye-pupil and which lies in front of or behind the background of the eye $y^3$, the lines $t^1$ and $t^3$ would lie in the centre of the rectangles $v^1$ and $v^3$ now imaged indistinctly but the lines $t^2$ and $t^4$ would not lie in the middle of the rectangles $v^2$ and $v^4$. After a rotation of the illuminating device about the telescope axis until the index $x$ indicates on the scale $r$ the value 90° there would hold good for the vertical pair of lines that what has been said about $t^1$, $t^3$ and conversely.

Whether the eye $y$ to be tested is afflicted with astigmatism may be recognized by the observer by the fact that, on the index $x$ being set to the zero point of the scale $r$, a simultaneous, sharp focussing of both pairs of rectangles $v^1$, $v^3$ and $v^2$, $v^4$ is not possible at all and the lines $t^1$, $t^2$, $t^3$ and $t^4$ appear displaced both in the horizontal and the vertical direction in the rectangles $v^1$, $v^2$, $v^3$ and $v^4$. Thereupon one rotates the illuminating device until the pair of lines $t^1$, $t^3$ lies in the middle of the corresponding rectangles $v^1$, $v^3$, i. e. until the measuring meridian falls into one of the principal sections of the eye. After that one adjusts the arm $e$ by means of the milled head $g^1$ until the other pair of lines $t^2$, $t^4$ also lies in the middle of the appertaining rectangles $v^2$, $v^4$. This adjustment being completed, the index $x$ indicates on the scale $r$ the position of this principal section and the index $s$ on the scale $b^2$ the appertaining refractive value of the principal point. If thereupon, by rotating the illuminating device through 90°, the index $x$ on the scale $r$ be brought into that position in which the measuring meridian coincides with the other principal section the pair of lines $t^2$, $t^4$, perpendicular to the measuring meridian, does not lie any more in the middle of the appertaining rectangles $v^2$, $v^4$. In order to reattain this adjustment, it is necessary to displace the arm $e$ anew by rotating the milled head $g^1$. The adjustment having been carried out, the refractive value of the principal point of the other principal section can be read off on the scale $b^2$ by means of the index $s$.

I claim:

1. Apparatus for the objective measurement of the refractive value of the principal point of the eye comprising an illuminating device, containing a source of light, a lens system and a light-aperture, a second lens system adapted to produce a real image of the background of the eye, at least a part of this lens system being adjustable along its optical axis, an observation device, a diaphragm forming part of the observation device, the diaphragm and the said light-aperture being so located as to be really imaged by the said second lens system side by side in the eye-pupil, a material mark lying in the path of the illuminating rays and being adapted to be really imaged by the first named and a part of the second lens system for forming with its real image a test mark allowing of determining the locus of the said real image of the background of the eye, the said light-aperture and the said material mark being simultaneously rotatable about the optical axis of the second lens system, and a comparison mark lying in the observation device and being displaceable along the optical axis of the second lens system.

2. Apparatus according to claim 1, the said comparison mark consisting of radial lines, the radial lines being disposed at right angles relatively to each other and not intersecting the optical axis, and being rotatable with the said material mark about the optical axis.

OTTO HENKER.